United States Patent
Day et al.

(10) Patent No.: US 6,212,062 B1
(45) Date of Patent: Apr. 3, 2001

(54) SEALED ULTRACAPACITOR

(75) Inventors: James Day, Scotia, NY (US); Katherine Dana DeJager, BJ Goes (NL)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/162,533

(22) Filed: Sep. 29, 1998

(51) Int. Cl.[7] .............................. H01G 9/00; H01G 9/02
(52) U.S. Cl. .................... 361/502; 361/512; 29/25.03
(58) Field of Search .................... 361/502, 503, 361/504, 512, 516, 520; 29/25.03; 204/291, 292, 293, 294; 252/62.2

(56) References Cited

U.S. PATENT DOCUMENTS

| | | |
|---|---|---|
| Re. 35,285 | 6/1996 | Quacquarella et al. . |
| 4,801,486 * | 1/1989 | Quacquarella et al. ............. 428/349 |
| 4,803,597 | 2/1989 | Watanabe et al. . |
| 5,136,472 | 8/1992 | Tsuchiya et al. . |
| 5,150,283 | 9/1992 | Yoshida et al. . |
| 5,420,747 | 5/1995 | Ivanov et al. . |
| 5,464,453 | 11/1995 | Tong et al. . |
| 5,486,387 | 1/1996 | Mueller . |
| 5,621,607 * | 4/1997 | Farahmandi et al. ............. 361/502 |
| 5,726,856 | 3/1998 | King, Jr. et al. . |
| 5,777,428 * | 7/1998 | Farahmandi et al. ............. 313/352 |

FOREIGN PATENT DOCUMENTS 11486   4/1996  (WO) .

OTHER PUBLICATIONS

"Mobility and Ionic Association of Lithium Salts in a Propylene Carbonate–Ethyl Methyl Carbonate Mixed Solvent", Ue & Mori, Electrochem. Soc., vol. 142, No. 8, Aug. 1995.

* cited by examiner

*Primary Examiner*—Anthony Dinkins
(74) *Attorney, Agent, or Firm*—Noreen C. Johnson; Douglas E. Stoner

(57) ABSTRACT

A multilayer cell is provided having two solid, nonporous current collectors, two porous electrodes separating the current collectors, a porous separator between the electrodes and an electrolyte occupying pores in the electrodes and separator. A thermoplastic vinyl acetate polymer or thermoplastic polyamide is applied to the multilayer structure; and pressure or heat is applied to seal layers of the cell with the thermoplastic vinyl acetate polymer or thermoplastic polyamide to form the ultracapacitor.

12 Claims, 4 Drawing Sheets

SEALED ULTRACAPACITOR

This invention was made with government support under Contract No. 38-83CH10093 awarded by DOE. The government may have certain rights in the invention.

BACKGROUND OF THE INVENTION

Capacitors are storage devices that store electrical energy on an electrode surface. Electrochemical cells create an electrical charge at electrodes by chemical reaction. The ability to store or create electrical charge is a function of electrode surface area in both applications. Ultracapacitors, sometimes referred to as double layer capacitors, are a third type of storage device. An ultracapacitor creates and stores energy by microscopic charge separation at an electrical chemical interface between electrode and electrolyte.

Ultracapacitors are able to store more energy per weight than traditional capacitors and they typically deliver the energy at a higher power rating than many rechargeable batteries. Ultracapacitors comprise two porous electrodes that are isolated from electrical contact by a porous separator. The separator and the electrodes are impregnated with an electrolytic solution, which allows ionic current to flow between the electrodes while preventing electronic current from discharging the cell. On the back of each electrode is a current collector. One purpose of the current collector is to reduce ohmic loss. If the current collectors are nonporous, they can also be used as part of the capacitor case and seal.

When electric potential is applied to an ultracapacitor cell, ionic current flows due to the attraction of anions to the positive electrode and cations to the negative electrode. Upon reaching the electrode surface, the ionic charge accumulates to create a layer at the solid liquid interface region. This is accomplished by absorption of the charge species themselves and by realignment of dipoles of the solvent molecule. The absorbed charge is held in this region by opposite charges in the solid electrode to generate an electrode potential. This potential increases in a generally linear fashion with the quantity of charge species or ions stored on the electrode surfaces. During discharge, the electrode potential or voltage that exists across the ultracapacitor electrodes causes ionic current to flow as anions are discharged from the surface of the positive electrode and cations are discharged from the surface of the negative electrode while an electronic current flows through an external circuit between electrode current collectors.

In summary, the ultracapacitor stores energy by separation of positive and negative charges at the interface between electrode and electrolyte. An electrical double layer at this location consists of sorbed ions on the electrode as well as solvated ions. Proximity between the electrodes and solvated ions is limited by a separation sheath to create positive and negative charges separated by a distance which produces a true capacitance in the electrical sense.

During use, an ultracapacitor cell is discharged by connecting the electrical connectors to an electrical device such as a portable radio, an electric motor, light emitting diode or other electrical device. The ultracapacitor is not a primary cell but can be recharged. The process of charging and discharging may be repeated over and over. For example, after discharging an ultracapacitor by powering an electrical device, the ultracapacitor can be recharged by supplying potential to the connectors.

The physical processes involved in energy storage in an ultracapacitor are distinctly different from the electrochemical oxidation/reduction processes responsible for charge storage in batteries. Further unlike parallel plate capacitors, ultracapacitors store charge at an atomic level between electrode and electrolyte. The double layer charge storage mechanism of an ultracapacitor is highly efficient and can produce high specific capacitance, up to several hundred Farads per cubic centimeter.

Ultracapacitors are multilayer structures that include two solid, nonporous current collectors, two porous electrodes separating the collectors and a porous separator between the electrodes. A nonaqueous electrolyte solution saturates the electrodes and separator layer. The electrolyte solution includes an organic solvent and an electrolyte. The structure is sealed to form the multilayer ultracapacitor. The electrolyte solution presents a deleterious environment that adversely affects sealants that are used to close and seal the layers of the ultracapacitor. The dielectric constant of the ultracapacitor depends upon the proportion of electrolyte salt to solute. The electrolyte solution breaks down sealant and causes loss of electrolyte through evaporation to change the proportion of electrolyte to solute. The present invention relates to a sealant and method of sealing an ultracapacitor that eliminates chemical interaction and mechanical degradation to an ultracapacitor seal that is caused by degradation of sealant by electrolyte solution. According to the present invention, the ultracapacitor conductor layer is sealed to an electrode by means of a vinyl acetate polymer or polyamide fusible binder. These polymeric fusible binders withstand electrolyte chemical attack to maintain ultracapacitor integrity, flexibility and barrier properties.

SUMMARY OF THE INVENTION

The invention relates to a method of making an ultracapacitor. In the method, a cell is provided that comprises two solid, nonporous current collectors, two porous electrodes separating the current collectors, a porous separator between the electrodes and an electrolyte occupying pores in the electrodes and separator. A thermoplastic vinyl acetate polymer or thermoplastic polyamide is applied to the multilayer structure; and pressure or heat is applied to seal layers of the cell by means of the thermoplastic vinyl acetate polymer or thermoplastic polyamide to form the ultracapacitor.

The invention also relates to an ultracapacitor that is sealed by means of the thermoplastic vinyl acetate polymer or thermoplastic polyamide.

DETAILED DESCRIPTION OF THE INVENTION

Figure 1:
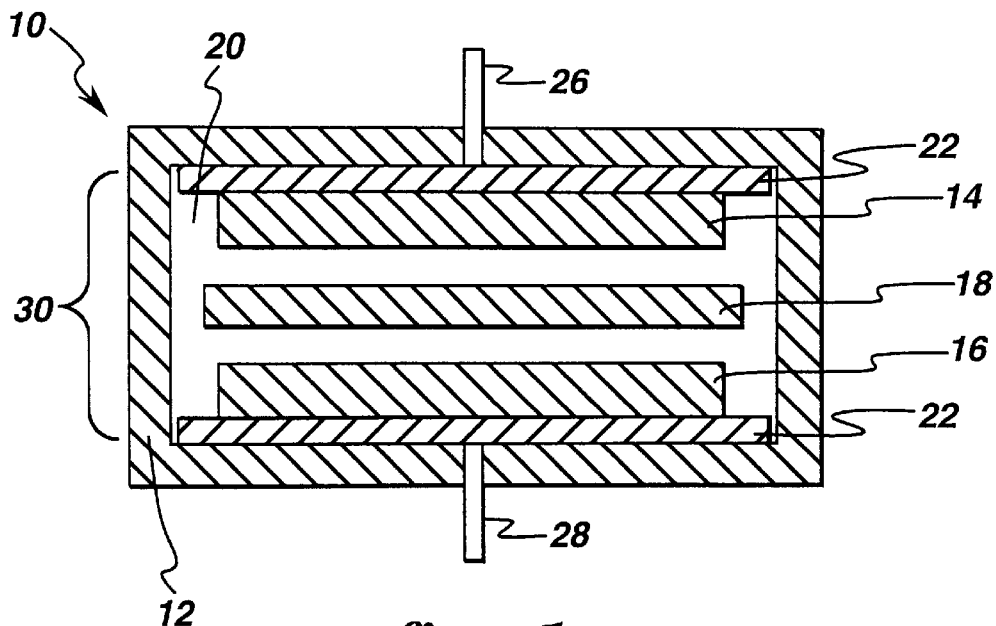
FIG. 1 is a front sectional view of an ultracapacitor.
Figure 2:
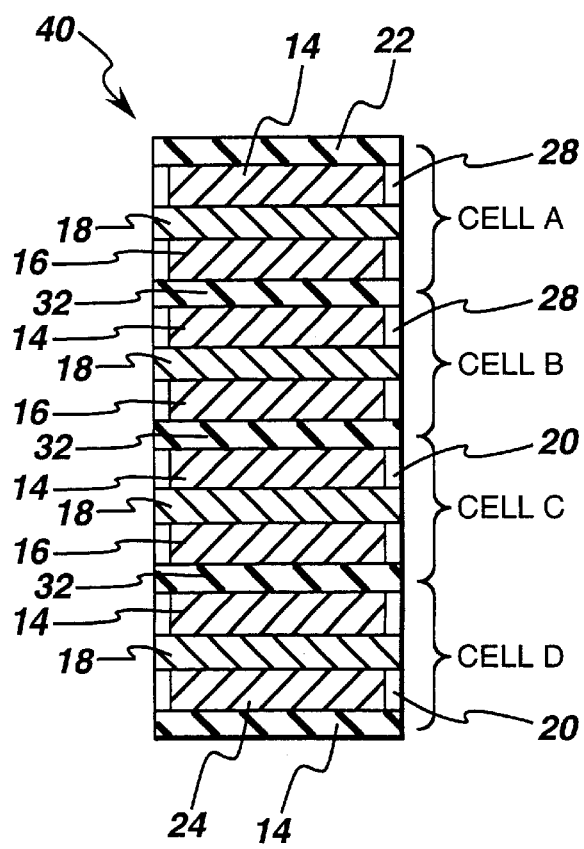
FIG. 2 is a front sectional view of a series stack of ultracapacitor cells.

The method of the invention may be used to make a wide variety of ultracapacitors such as described in U.S. Pat. Nos. 5,464,453; 5,420,747; 5,150,283; 5,136,472; and 4,803,597; as well as PCT Application WO96/11486 (PCT/US95/12772; Apr. 18, 1996), all of which are incorporated herein by reference. FIGS. 1 and 2 herein, are based on PCT Application WO 96/11486 and show non-limiting examples of structures made by the method of the present invention.

In all of the Figures of this application, like structures are identified by the same numbers.

Referring to FIG. 1, ultracapacitor 10 includes a nonconductive enclosing body 12, a pair of carbon electrodes 14 and 16, an electronic porous separator layer 18, an electrolyte 20, a pair of conductive layers which are current collectors 22 and 24 and electrical leads 26 and 28, extending from the current collectors 22 and 24. One of the pair of current collectors 22 and 24 is attached to the back of each electrode 14 and 16. In FIG. 1, electrodes 14 and 16 can each represent a plurality of electrodes so long as the electrodes are porous to electrolyte flow.

The current collectors 22, 24 commonly are made of aluminum because of its conductivity and cost. In the drawings, the current collectors 22 and 24 are thin layers of aluminum foil. However, the electrodes can be any suitable material as described above.

The electronic separator 18 is preferably made from a highly porous material which acts as an electronic insulator between the carbon electrodes 14 and 16. The separator 18 assures that opposing electrodes 14 and 16 are never in contact with one another. Contact between electrodes can result in a short circuit and rapid depletion of the charges stored in the electrodes. The porous nature of the separator 18 allows movement of ions in the electrolyte 20. A wide variety of types and arrangements of separation layers can be employed, as those of ordinary skill in the electrochemical arts realize. Separation layers are usually made from nonconductive materials such as cellulosic materials; glass fiber; polymers such as polyesters or polyolefins; and the like. In those embodiments in which the separator layers will be in contact with sealant material, they should have a porosity sufficient to permit the passage of sealant and should be resistant to the chemical components in the sealant. In a typical ultracapacitor, the separator layers have a thickness in the range of about 0.5 mil to about 10 mils. Preferred separators 18 are porous polypropylene and tissue cellulosic materials.

Exemplary organic solvents for electrolyte 20 include but are not limited to nitriles such as acetonitrile, acrylonitrile and propionitrile; sulfoxides such as dimethyl, diethyl, ethyl methyl and benzylmethyl sulfoxide; amides such as dimethyl formamide and pyrrolidones such as N-methylpyrrolidone. Preferrably, the electrolyte 20 includes a polar aprotic organic solvent such as a cyclic ester, chain carbonate, cyclic carbonate, chain ether and/or cyclic ether solvent and a salt. Preferred cyclic esters are esters having 3 to 8 carbon atoms. Examples of the cyclic esters include -butyrolactone and valerolactone. The chain carbonates are preferred to be carbonates having 3 to 8 carbon atoms. Examples of the chain carbonates include dimethyl carbonate, diethyl carbonate, dipropyl carbonate, methyl ethyl carbonate, methyl propyl carbonate and ethyl propyl carbonate. The preferred cyclic carbonates have 5 to 8 carbon atoms. Examples of the cyclic carbonates include 1,2-butylene carbonate, 2,3-butylene carbonate, 1,2-pentene carbonate, 2,3-pentene carbonate and propylene carbonate. The preferred chain ethers have 4 to 8 carbon atoms. Examples of the chain ethers include dimethoxyethane, diethoxyethane, methoxyethoxyethane, dibutoxyethane, dimethoxypropane, diethoxypropane and methoxyethoxypropnane. The preferred cyclic ethers have 3 to 8 carbon atoms. Examples of the cyclic ethers include tetrahydofuran, 2-methyl-tetrahydrofuran, 1,3-dioxolan, 1,2-dioxolan, 2-methyldioxolan and 4-methyl-dioxolan.

Suitable electrolyte salts include quaternary ammonium salts such as tetraethylammonium tetraflouroborate ((Et)$_4$NBF$_4$), hexasubstituted guanidinium salts such as disclosed in U.S. Pat. No. 5,726,856, the disclosure of which is incorporated herein by reference, and lithium salts such as disclosed by Ue et al., Mobility and Ionic Association of Lithium Salts in a Propylene Carbonate-Ethyl Carbonate Mixed Solvent, Electrochem. Soc., vol. 142, No. 8, Aug. 1995, the disclosure of which is incorporated herein by reference.

In a preferred embodiment, the electrodes 14, 16 in FIG. 1, are both carbon electrodes on aluminum current collectors. The electrode can be fabricated by a forming process or by pressing electrode materials in a die and slurry pasting or screen printing carbon as a paste with a liquid phase binder/fluidizer. The liquid phase may be water or an electrolyte solvent with or without a thinner such as acetone. Both dry and wet electrode formations may include a binder such as polymers, starches, Teflon® particles or Teflon® dispersions in water.

The enclosing body 12 can be any known enclosure means commonly used with ultracapacitors. It is an advantage to minimize the weight of the packaging means to maximize the energy density of the ultracapacitor. Packaged ultracapacitors are typically expected to weigh 1.25 to 2 times more than the unpackaged ultracapacitor. The electrical leads 26 and 28 extend from the current collectors 22 and 24 through the enclosing body 12 and are adapted for connection with an electrical circuit (not shown).

Ultracapacitor 10 of FIG. 1 includes a bipolar double layer cell 30 that includes two solid, nonporous current collectors 22, 24, two porous electrodes 14, 16 separating the current collectors 22, 24 and a porous separator 18 between the electrodes 14, 16 and an electrolyte 20 occupying pores in the electrodes 14, 16 and separator 18. Individual ultracapacitor cells can be stacked in series to increase operating voltage. The optimum design is to have adjacent cells separated with only a single current collector. This collector is nonporous so that no electrolytic solution is shared between cells. This type of design is called bipolar and is illustrated in FIG. 2 of the drawings. In a bipolar double layer capacitor, one side of the current collector contacts a positive electrode and the other side contacts a negative electrode of an adjacent cell. A series stack 40 of the high performance bipolar double layer cells 30 (A, B, C and D) is illustrated in FIG. 2. In FIG. 2, each pair of polarized carbon electrodes, 14, 16 is separated with a separator 18. A current collector 32 is attached at one surface to charged electrode 14 of a first cell. Attached to an opposite surface of the current collector 32, is an oppositely charged electrode 16 of a second cell. If one side of the current collector 32 is in contact with the negative electrode for a first capacitor cell "A," then the other side of the same current collector 32 is in contact with a positive electrode for an adjacent cell "B." A sufficient amount of an electrolyte 20 is introduced such that the electrolyte 20 saturates the electrodes 14 and 16 and separator 18 within each cell. Exterior current collectors 22 and 24 are placed at each end of the stack.

The internal current collectors 32 of the series stack of cells are preferably nonporous layers of aluminum foil designed to separate the electrolyte 20 between adjacent cells. The exterior current collectors are also nonporous such that they can be used as part of the external capacitor case seal, if necessary. The electronic separator 18 is located between the opposing carbon electrodes 14 and 16 within a particular capacitor cell. The electronic separator 18 allows ionic conduction via charged ions in the electrolyte.

The ultracapacitor cell can be constructed by placing the layers of conductor, electrode and separator along with electrolyte within an enclosing body. The structure can then be subjected to pressure to seal the layers within the enclosing body. Alternatively, the enclosing body can be subjected to pressure and vacuum. The vacuum acts to remove gases while the ultracapacitor is sealed. Alternatively, the ultracapacitor cell can be constructed by providing adhesive between layers and applying pressure and or heat throughout the adhesive to seal the cell.

Figure 3:
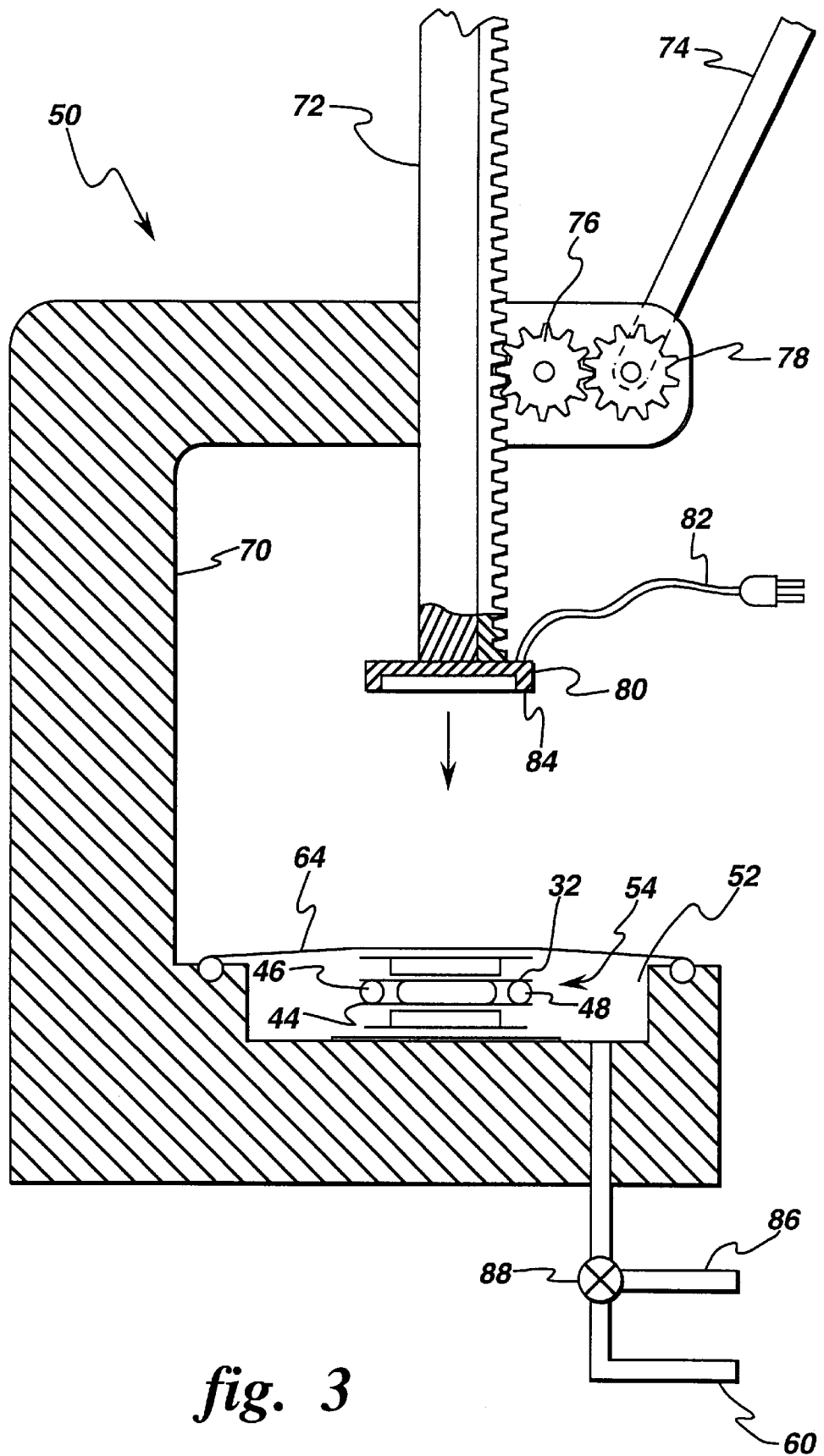
FIG. 3 is a cross-sectional view of an exemplary apparatus for sealing an ultracapacitor.

FIG. 3 depicts one, non-limiting illustration of a method of sealing an ultracapacitor or series stack of ultracapacitor cells according to the present invention. Referring to FIG. 3, structure 50 is a frame, platform, or other construction but is often a press as described below. An enclosable region is depicted in FIG. 3 as recess 52, in which an ultracapacitor series stack 40 is disposed. The embodiment illustrated in FIG. 3 permits application of vacuum while the ultracapacitor is being sealed. Primary vacuum tube 60 communicates with recess 52. A collapsible membrane 64 can be fastened over the ultracapacitor to maintain a vacuum while the cell is being sealed by pressing.

Figure 4:
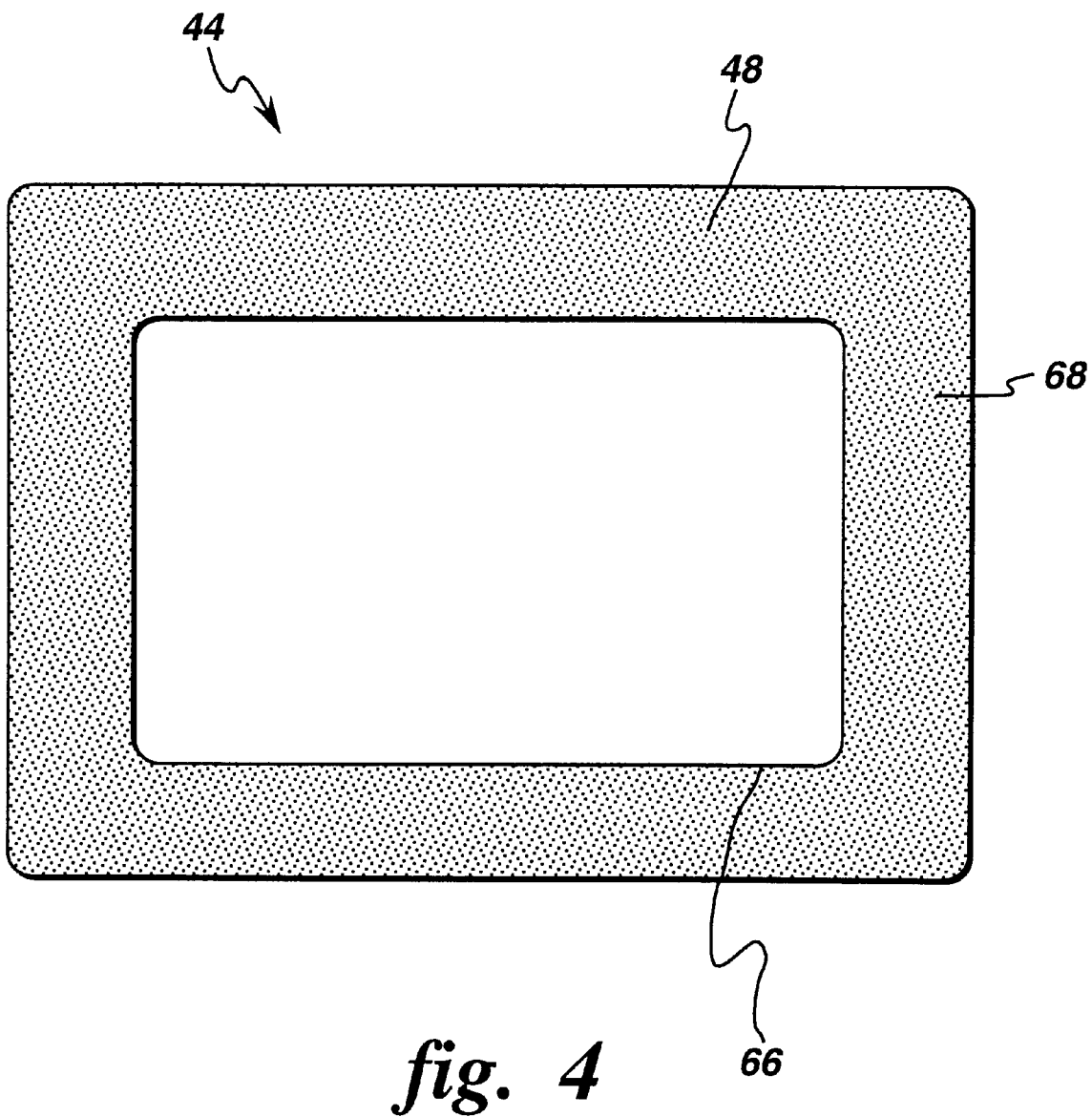
FIG. 4 is a top cross-sectional view of a separator of a sealed ultracapacitor.
Figure 5:
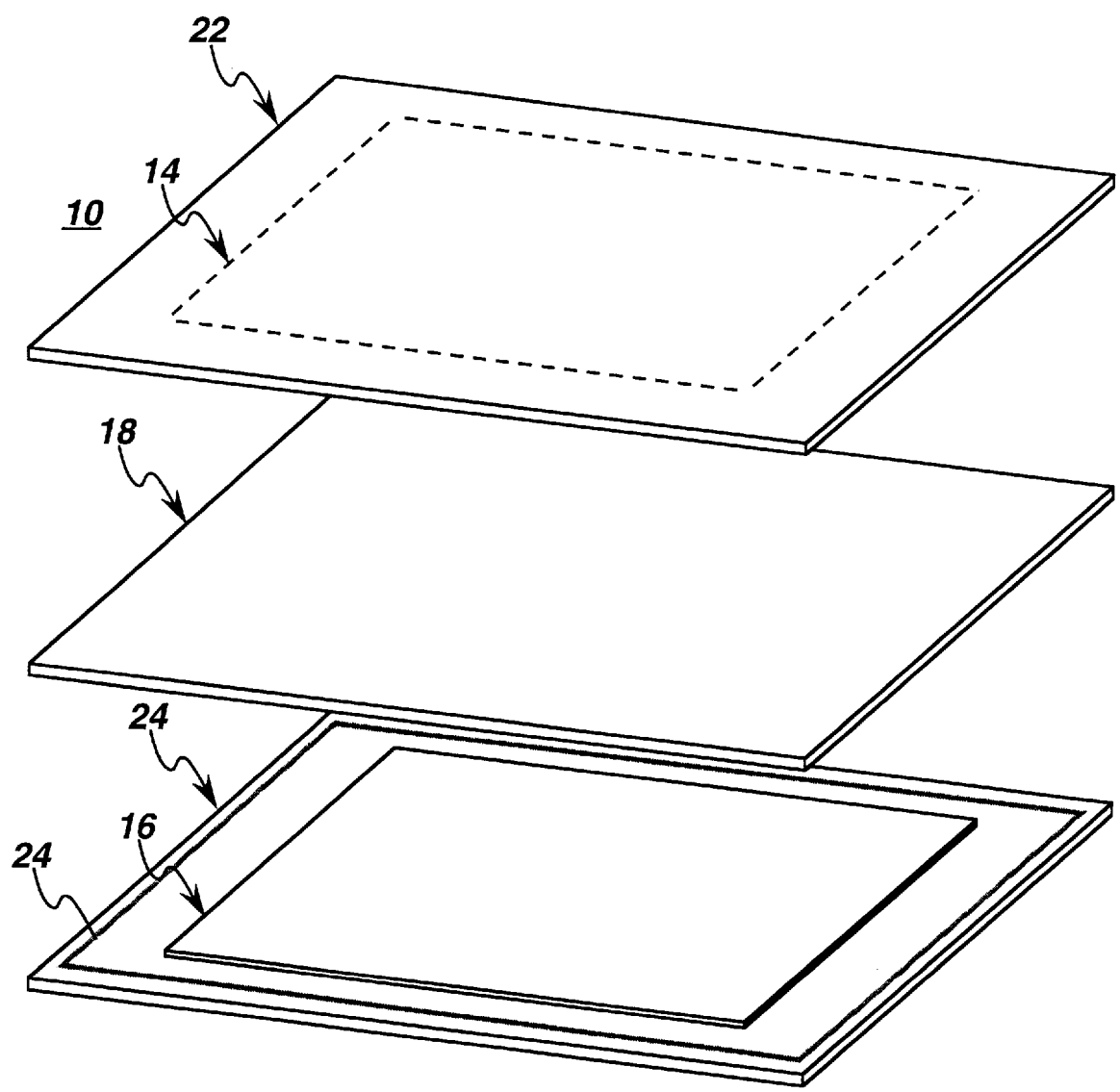
FIG. 5 is an exploded schematic view of an ultracapacitor sealed in accordance with the present invention.

FIG. 3 shows an ultracapacitor cell disposed in the recess area of the press 50. The cell includes a separator system, comprising an upper separator layer 42 and a lower separator layer 44. Sealant portions 46 and 48 are disposed in a peripheral area between the bottom surface of separator 42 and the top surface of separator 44. In FIG. 5, FIG. 4 provides a top, cross-sectional view of a separator layer similar to layer 44 of FIG. 3, after sealant has spread to some extent by the action of pressure and, optionally, heat, as described below. The boundary area 68 surrounds the primary section 66 of a separator layer. Collector plate 22 is an aluminum foil coated with a thin electrode 14 and collector plate 24 is coated with electrode 16. Separator layer 18 is positioned between the collector plate plates 22, 24. Heat sealant layer 90 is disposed between the collector plates 22, 24 and separator layer 18 and comprises a thermoplastic vinyl acetate polymer or thermoplastic polyamide. A thermoplastic polymer softens when exposed to heat and returns to its original condition when cooled to room temperature. Ethylene vinyl acetate copolymer ("EVA") and polyamide thermoplastic polymers are preferred thermoplastic polymers in the present invention. Preferably, the EVA has a softening point of at least 100 C. Preferably, the EVA has a vinyl acetate content of between 18% and 35% by weight of the EVA, even more preferably the EVA has a vinyl acetate content of about 28% by weight of the EVA. Several commercially available EVA thermoplastic polymers are suitable for the sealant layer. These include ELVAX 4260 having a melt index of 6 and a 28% vinyl acetate content by weight of the EVA, ELVAX 3175 having a melt index of 6 and a 28% vinyl acetate content by weight of the EVA. Also useful is ELVAX 3182, a 3 melt index resin with a vinyl acetate content of about 28% by weight of the EVA. These resins are available from DuPont. Additionally, Exxon 767.36 (2.5 melt index, 30% vinyl acetate) and Exxon 760.36 (3 melt index, 27.5% vinyl acetate) are suitable for the sealant layer. SEARS HOT GLUE, an ethylene/vinyl acetate copolymer from Sears is a most preferred EVA thermoplastic polymer. SEARS HOT GLUE is characterized by a vinyl acetate content of about 28%, a softening point of about 158 C and a melt index of about 6.

Suitable polyamides are hot melt, elastomeric thermoplastic adhesives. Preferably the polyamides have a softening point of at least 100 C. The HYSOL polyamide adhesives are thermoplastic polymers available from HYSOL Engineering & Industrial Productions Division of Dexter Corporation. HYSOL 7802, HYSOL 7804 and HYSOL 7811 are preferred thermoplastic polyamides in the present invention.

Again referring to FIG. 4, this invention encompasses several embodiments for applying sealant to seal an ultracapacitor cell or stack of cells. In a first embodiment as shown in FIG. 5, the sealant 90 is applied onto a collector plate 22 or 24 peripherally to respective electrode 14 or 16. The sealant layer 90 extends beyond the area of electrode 14 or 16 to contact separator 18. When compression and/or heat is applied, the sealant seals all of a collector plate, electrode and separator. The sealed cell body including collector plates 22, 24, electrodes 14, 16 and separator 18 can then be further sealed by the application of a sealant of the invention or another suitable sealant to hermetically seal the cell at its outer edges either singly or as a stack of cells. In another embodiment, a gasket of elastomeric material can be applied peripherally as layer 90 to hold the electrodes 14, 16 in place and the sealant of the invention can be applied to hermetically seal the cell at its outer edges either singly or as a stack of cells.

A compressive force is applied to promote the flow of the sealant—especially in the case of sealant compositions with very high softening points or glass transition temperatures, such as the EVA based types. Compression can be applied indirectly to the sealant through upper ultracapacitor layers by means of the mechanical press 50 of FIG. 3. Other devices to seal an ultracapacitor include an hydraulic press or pneumatic press or any device for applying compressive force. The press 50 of FIG. 3 includes structural frame 70 and adjustable beam 72. The length of beam 72 moves in a direction perpendicular to the base portion of the structural frame as controlled by the selective action of hand lever 74 and gears 76 and 78. Compression element 80 is detachably attached as the base of beam 72. Bottom surface 82 can be similar in shape to the peripheral area of the top planar surface of ultracapacitor 40. The force applied by the press should be sufficient to cause the sealant to become substantially fluid, to flow and form a continuous bead or strip around the peripheral area of the layer on which it is deposited. Thus, the particular press force depends in large part on the nature of the sealant. In general, the pressure will be in the range of about 1 psi to about 1,000 psi and preferably, in the range of about 10 psi to about 100 psi. A lower press force will be suitable for lower viscosity sealants and a higher press force will be required for higher viscosity materials.

The sealant can be heated while being compressed. Heating enhances the flow characteristics of the sealant. Heating temperature should be sufficient to soften the sealant. Preferably, the temperature is high enough to melt the sealant. For a sealant made from an EVA based material, a suitable temperature will be in the range of about 100° C. to about 300° C.

Heat is applied to the sealant in the press 50 of FIG. 3 by means of a standard electrical heating element that is encased within element 80 and is connected to an electrical outlet by way of cord 82. The bottom surface 84 of element 80 has a shape that aligns with sealant-containing peripheral regions of ultracapacitor 10. Thus, when compression element 80 is lowered for compression of the ultracapacitor through membrane 64, heat is transmitted primarily to the sealant containing regions.

A vacuum can be applied to press together the layers of the ultracapacitor and to evacuate ambient gasses from the internal region of the cell structure. In FIG. 3, vacuum tube 60 is connected to a vacuum source through vacuum valve 88 with backfill vacuum tube 86. When vacuum is applied, the collapsible membrane 64 is positioned over recess 52. The membrane 64 maintains the vacuum within the recess and transmits the applied compressive force to the layers of the ultracapacitor. The membrane 64 is heat-resistant to a temperature of about 400° C. The amount of vacuum applied ranges from about 700 mm mercury to 0.1 mm mercury. A typical vacuum pressure is in the range of about 500 mm mercury to about 0.1 mm mercury.

In operation, the applied vacuum pressure draws collapsible membrane 64 tightly against the top of ultracapacitor 10, compressing the individual layers of the ultracapacitor against platform layer 58 while the action of compression element 80 presses against sealant-containing regions to induce sealant 46, 48 to permeate the peripheral regions of separator layers 18. The sealant contacts substantially aligned peripheral areas 60 of the facing surfaces of conductive layers 22 and 24. As the sealant cures or solidifies, it forms a strong bond to join layers 22 and 24. After sealing is complete, compression element 80 is retracted and the ultracapacitor is allowed to cool.

The following examples are illustrative of the invention.

EXAMPLE 1

A series of studies were conducted to determine the stability of various sealants under conditions of ultracapacitor use. In a first set, the sealants were studied for resistance to electrolyte solvent over time under various temperature conditions.

Constant temperature ovens set to 37° C., 57° C., 66° C., and 85° C. were used for elevated temperature measurements. In each case, a sample of a cured sealant material was allowed to soak in a closed jar filled with solvent at room temperature and the four elevated temperatures. Periodically, the samples were removed from the jars, dried quickly of surface liquid by sandwiching samples between very absorbent laboratory wipes, and weighed. The materials were then returned to the jars and the ovens for further soaking.

A number of the candidates failed this test very quickly. Polysulfones, polycarbonates, polyurethanes, methacrylate esters and low-cure, low-molecular-weight epoxies dissolved within a day or two at room temperature or slightly elevated temperature. Other candidates, such as the polysulfides, fared only slightly better, rapidly gaining weight in a day at room temperature and completely dissolving at elevated temperatures. Highly crosslinked epoxies maintained mechanical integrity but swelled over longer periods of time. Only silicones and EVA materials were resistant to attack and swelling. The silicones, however, allowed solvent in a gas phase to diffuse over time.

EXAMPLE 2

Adhesion to aluminum was measured on a polyamide, an ethylene vinyl acetate copolymer, several silicone sealants and a polypropylene.

The sealants were cured on an aluminum plate with an upper mesh substrate. The mesh was pulled away from the aluminum plate in an Instron tensile strength instrument under controlled conditions and peel strength (in-lb) was calculated. This test was run at room temperature. A polyamide and an ethylene vinyl acetate copolymer scored the highest average peel strength of all tested sealants.

EXAMPLE 3

Creep is the movement or flow of a solid under load. If creep occurs in a sealant material, it starts very early at elevated temperatures and plateaus at nearly zero or starts early and gradually increases with time. Polyamide HYSOL 7802 (a polyamide adhesive from HYSOL Aerospace & Industrial Products Division of Dexter Corporation) was evaluated for creep in a creep test jig. Results on the 7802 HYSOL polyamide showed no creep at 60 C and 40 psi compressive load over 15 days. This result indicates good resistance to creep for this sealant material.

EXAMPLE 4

Five strips of each of the following samples were soaked in propylene carbonate for eighteen days at room temperature and weight gain or loss was determined:

TABLE

|  | Initial Weight (gms.) | Percent Weight Gain/Loss |
|---|---|---|
| Barco Bond | 3.1299 | −1.1% |
| Electronic Grad RTV | 2.8782 | +0.21 |
| Devcon 5 minute Epoxy | 1.8190 | +7.7 |
| Sears Hot Glue | 4.6909 | 0.0% |

Barco Bond is an epoxy resin. RTV stands for "Room Temperature Vulcanizable" and is a silicone adhesive. Deacon 5 is an epoxy resin corsslinked with a hardener.

The above test data show zero transmissions through the EVA sealant. Further, no mechanical changes were noted in the ultracapacitors during the testing operations. Adhesion tests show that EVA exhibits excellent adhesion to aluminum conductors even after months of soaking in solvent polypropylene carbonate

What is claimed is:

1. An ultracapacitor comprising at least one cell, said cell comprising two solid, nonporous current collectors, two porous electrodes separating said current collectors, a porous separator between said electrodes and an electrolyte occupying pores in said electrodes and separator,
    wherein at least one electrode is sealed to one of said collectors by a thermoplastic vinyl acetate polymer or thermoplastic polyamide.

2. The ultracapacitor of claim 1, wherein said at least one electrode is sealed to one of said collectors by an ethylene vinyl acetate copolymer wherein said thermoplastic vinyl acetate is an ethylene vinyl acetate copolymer having a vinyl acetate content of between 18% and 35% by weight of the ethylene vinyl acetate.

3. A stack of ultracapacitor cells, comprising at least one of the cells of claim 2.

4. The ultracapacitor of claim 1, wherein said at least one electrode is sealed to one of said collectors by a thermoplastic ethylene vinyl acetate copolymer having a softening point of at least 100 C.

5. A stack of ultracapacitor cells, comprising at least one of the cells of claim 4.

6. The ultracapacitor of claim 1, wherein said at least one electrode is sealed to one of said collectors by a thermoplastic polyamide.

7. A stack of ultracapacitor cells, comprising at least one of the cells of claim 6.

8. The ultracapacitor of claim 1, wherein at least one of said current collectors is aluminum.

9. The ultracapacitor of claim 1, wherein said electrodes comprise carbon.

10. The ultracapacitor of claim 1, wherein said separator is polypropylene or cellulosic tissue material.

11. The ultracapacitor of claim 1, wherein said electrolyte comprises a polar aprotic organic solvent and a quaternary ammonium salt, a hexasubstituted quanidium salt or a lithium salt.

12. A stack of ultracapacitor cells, comprising at least one of the cells of claim 1.

* * * * *